Figure 1:
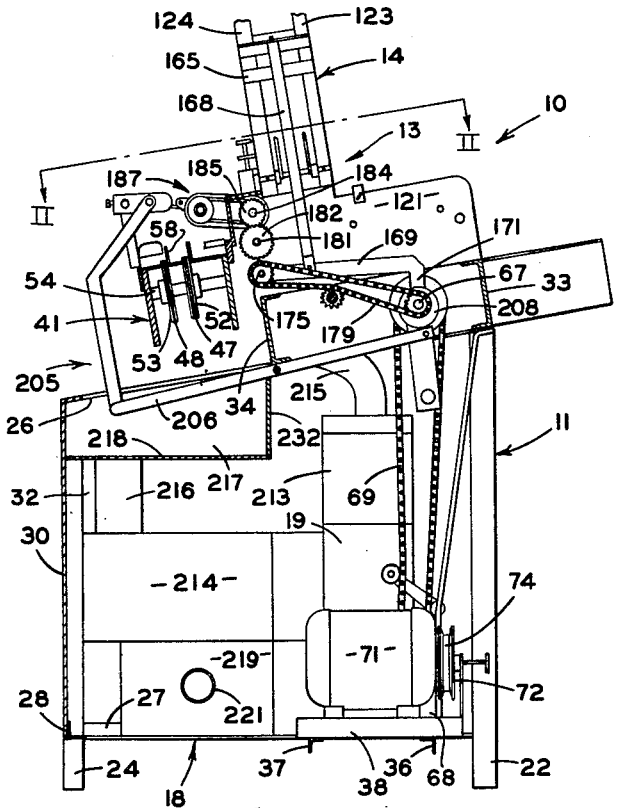

Nov. 17, 1964    H. C. WINKEL ETAL    3,157,269
BATTERY MAKING MACHINE

Original Filed Jan. 18, 1956    3 Sheets-Sheet 1

INVENTORS
HERBERT C. WINKEL
CHARLES H. McALPINE
KENNETH G. McGOWAN
BY
Woodhams Blanchard y Flynn
ATTORNEYS Nov. 17, 1964    H. C. WINKEL ETAL    3,157,269
BATTERY MAKING MACHINE Original Filed Jan. 18, 1956    3 Sheets-Sheet 2

INVENTORS
HERBERT C. WINKEL
CHARLES H. McALPINE
KENNETH G. McGOWAN
BY
Woodhams Blanchard & Flynn
ATTORNEYS Nov. 17, 1964   H. C. WINKEL ETAL   3,157,269
BATTERY MAKING MACHINE Original Filed Jan. 18, 1956   3 Sheets-Sheet 3

INVENTORS
HERBERT C. WINKEL
CHARLES H. McALPINE
BY  KENNETH G. McGOWAN

Woodhams, Blanchard & Flynn
ATTORNEYS

United States Patent Office 3,157,269
Patented Nov. 17, 1964

3,157,269
BATTERY MAKING MACHINE
Herbert C. Winkel, Watervliet, Kenneth G. McGowan, Lawrence, and Charles H. McAlpine, Coloma, Mich., assignors, by direct and mesne assignments, to Winkel Machines Company, Inc., Watervliet, Mich., a corporation of Michigan
Original application Jan. 18, 1956, Ser. No. 560,004, now Patent No. 2,908,377, dated Oct. 13, 1959. Divided and this application Oct. 31, 1958, Ser. No. 771,039
2 Claims. (Cl. 198—23)

This invention relates to apparatus for assembling battery plates and separators into cell groups and, more particularly, relates to an improved apparatus for feeding plates and separators onto a conveyor. This application is a division of Patent No. 2,908,377 filed January 18, 1956.

A variety of different mechanisms have been suggested in the past for feeding battery plates and separators onto a conveyor. However, none of these prior machines have been completely satisfactory for these purposes. In some instances, the plates and separators have been picked up by suction cups and have been moved over the conveyor whereupon the suction is cut off and the battery elements allowed to drop onto the conveyor. This type of apparatus is not only relatively slow in operation but also treats the battery plates roughly so as to knock off pieces of the lead oxide paste therefrom. Further, prior machines have not been capable of feeding plates and separators at a high rate of speed and in such a manner that a stack of battery plates and separators could be formed on and moved along with a continuously moving conveyor.

Accordingly, the objects of the invention include the following:
(1) To provide an improved apparatus for feeding battery plates and separators onto a continuously moving conveyor belt.
(2) To provide an improved apparatus, as aforesaid, in which individual plates and separators will be fed by their respective feeding devices onto a platform where they may be engaged by impellers, as upstanding lugs, on the conveyor and urged thereby off the platform onto the conveyor.
(3) To provide an improved apparatus, as aforesaid, which is inexpensive to manufacture and maintain, and which will operate satisfactorily with a wide variety of different types of battery plates and separators.
(4) To provide an improved apparatus, as aforesaid, which will feed and stack battery plates and separators at a much faster rate than is possible with prior machines or by hand, but which will do so without treating the plates or separators roughly so as to cause damage thereto.

Figures 6, 7:
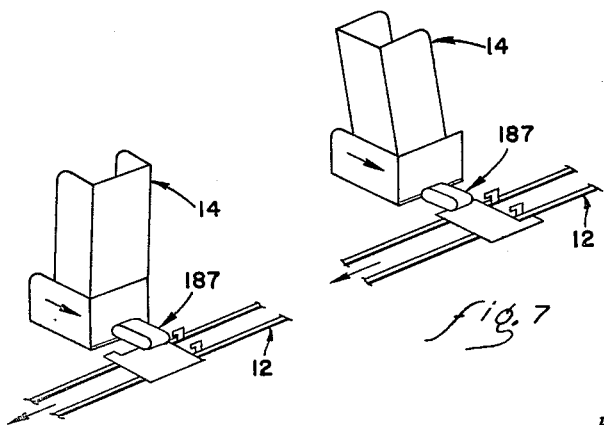
Figure 3:
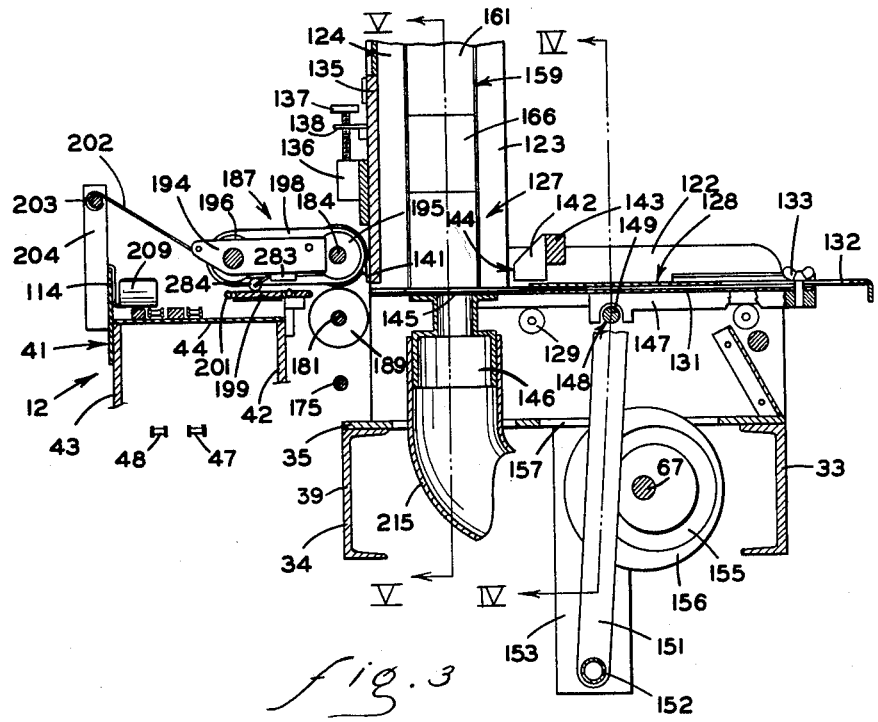
Figure 2:
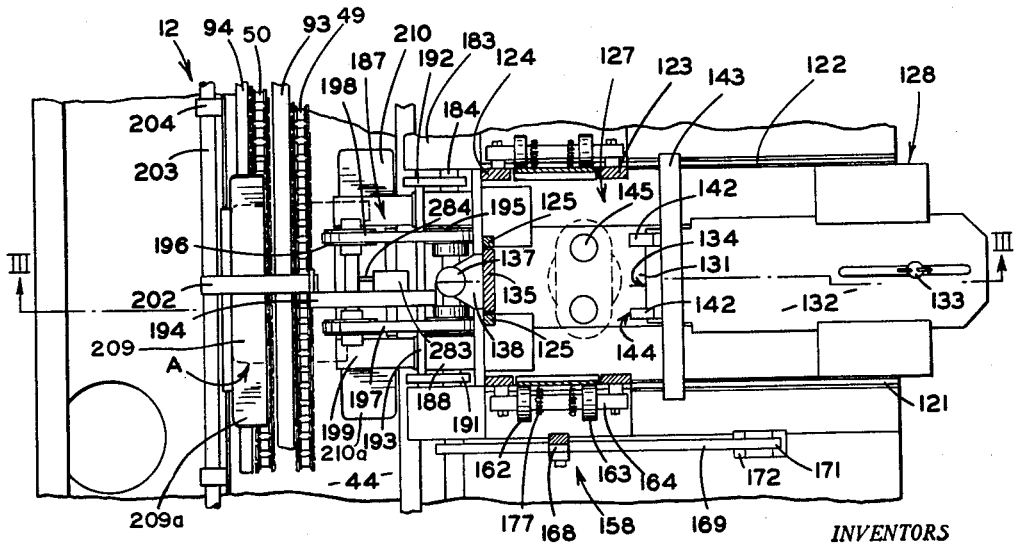
Figures 4, 5:
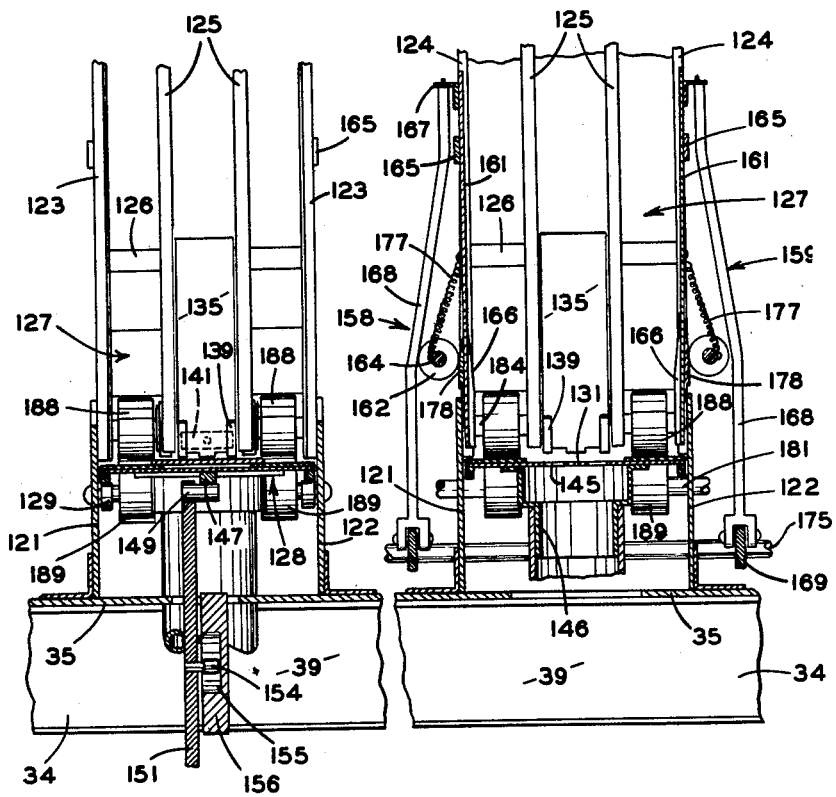

Other objects and purposes of this invention will become apparent to persons familiar with this type of equipment upon reading the following specification and examining the accompanying drawings, in which:

FIGURE 1 is a broken, end elevation view of a machine embodying our invention for assembling cell groups of battery plates and plate separators.
FIGURE 2 is a sectional view, taken on the line II—II of FIGURE 1.
FIGURE 3 is a sectional view, taken on the line III—III of FIGURE 2.
FIGURE 4 is a sectional view, taken on the line IV—IV of FIGURE 3.
FIGURE 5 is a sectional view, taken on the line V—V of FIGURE 3.
FIGURE 6 is a schematic, oblique view of a feeding device disposed alongside of a portion of the conveyor mechanism, as disclosed in the preceding figures.
FIGURE 7 is a schematic, oblique view which differs from FIGURE 6 in that the battery elements are fed endwise instead of sidewise onto the conveyor.

For the purpose of convenience in description, the terms "upper," "lower," "front," "rear," and derivatives thereof, will have reference to the assembly machine and parts thereof as appearing in FIGURE 1. The terms "trailing end" and "discharge end" will have reference to the left and right ends, respectively, of the machine as appearing in FIGURE 4. The terms "inner," "outer," and derivatives thereof, will have reference to the geometric center of said machine and parts thereof.

General Description

The machine 10 (FIGURES 1, 2, 3 and 4) is comprised of a rectangular frame structure 11, which supports a conveyor mechanism 12 disposed lengthwise of the machine. A feeding apparatus 13, which is comprised of a plurality of feeding devices, such as the plate feeders 14 and substantially similar separator feeders not shown, is disposed along the path of the conveyor mechanism 12 for feeding battery elements, such as plates and plate separators, respectively, onto the conveyor mechanism 12. An exhaust system 18 is provided for removing any dust which may be loosened from the lead oxide paste in the battery plates during the assembly thereof into said battery cell units by the machine 10. Mechanical and electrical timing mechanism not shown may be provided for synchronizing the movements of the feeding apparatus 13 with the motion of the conveyor mechanism 12.

Detailed Construction

As shown in FIGURE 1, the frame structure 11 of the assembly machine 10 is provided with front legs 22 and rear legs, one of which is shown at 24, said front legs being longer than said rear legs, for reasons appearing hereinafter. The upper ends of said front and rear legs, at corresponding ends of the structure 11, are connected by coplanar end plates 26, which, due to the longer length of said front legs, slope downwardly toward the rear of the frame structure 11. The lower ends of said legs are connected by parallel end braces 27 and a side brace 28. This leg structure is enclosed by a rear side sheet 30 and a pair of end sheets 32.

A pair of parallel channel members 33 and 34 extend between, and are supported upon, the end plates 26, the front channel member 33 being directly above the front legs 22, and the rear channel member 34 being disposed approximately midway between said front and rear legs. A support plate 35 (FIGURE 3) extends between, and is mounted upon, the channel members 33 and 34, parallel with the end plates 26. A pair of parallel angle members 36 and 37 (FIGURE 1) are supported upon, and extend between, the end braces 27 to support a motor platform 38 near the front of the machine 10. The frame structure 11 is preferably, but not necessarily, fabricated from structural steel and sheet metal in this particular embodiment.

The conveyor mechanism 12 (FIGURES 1 to 3, inclusive) is mounted upon a conveyor frame 41, which is comprised of a pair of parallel, spaced side plates 42 and 43, which support upon their upper edges a conveyor bed plate 44. The conveyor frame 41 is supported at the opposite end thereof upon the end plates 26 by any convenient means, not shown, so that said bed plate 44 is parallel with, and spaced above, said end plates 26. The front side plate 42 of the conveyor frame 41 is preferably parallel with, and spaced rearwardly from, the rear channel member 34.

A pair of substantially identical, endless conveyor chains 47 and 48 are disposed between the side plates 42 and 43 so that the upper courses 49 and 50 of said chains are disposed upon the upper surface of the bed plate 44, parallel with, and spaced from, each other. The conveyor chains 47 and 48 are supported at the trailing ends of their upper courses upon the sprockets 52 and 53, which sprockets are in turn mounted upon a shaft 54 rotatably supported upon the side plates 42 and 43. Said conveyor chains 47 and 48 are supported at the discharge ends of their upper courses upon suitable sprockets, which are mounted upon a shaft rotatably supported between, and upon, the side plates 42 and 43 as shown in the aforementioned Patent No. 2,908,377. The chains 47 and 48 are each provided with a plurality of uniformly spaced hooks 58, which extend upwardly from the upper courses of said chains, and are aligned in pairs transversely of said upper courses for simultaneously engaging plates and/or plate separators as they are fed onto said conveyor chains 47 and 48 by means described in detail hereinafter.

The upper reaches 49 and 50 of the chains 47 and 48 are driven toward the discharge end (upwardly in FIGURE 2) through means such as shown in said Patent No. 2,908,377 by a line shaft 67, which is substantially parallel with, and disposed between, the channel members 33 and 34. The line shaft 67 (FIGURE 1) is connected by a chain 69 to a gear box 68, which is operated by the motor 71 through the pulley 72 and the interconnecting belt 74. The pulley 72 on the motor 71 may be a variable pitch type.

Upper course guide bars 93 and 94 (FIGURE 2) are disposed upon the conveyor bed plate 44 parallel with, and adjacent to, the rearward sides of the upper courses 49 and 50, respectively. A side sheet 114 (FIGURE 3) is secured to, and extends above, the rear side plate 43 to prevent lateral displacement of the battery elements as they are moved along the bed plate 44 by the conveyor chains 47 and 48.

The feeding device 14 has a pair of substantially parallel, spaced side plates 121 and 122, which are mounted upon the support plate 35, transversely of the channel members 33 and 34. A pair of spaced, upright side posts 123 and 124 (FIGURE 3) are secured to each side plate 121 and 122 near the rear end thereof, and a pair of spaced, upright end posts 125 (FIGURE 5) are disposed between the rearward side posts 123 and supported thereon by means of crossbars 126. The side posts 123 and 124 and end posts 125 cooperate to define three sides of a compartment 127 into which stacks of battery plates or battery plate separators are inserted. The posts 123, 124 and 125 are perpendicular to the sloped, upper surface of the frame structure 11 and, therefore, are inclined to the vertical. Thus, plates and/or separators placed within the compartment 127 will lean against the end posts 125 thereof. In the case of the plate feeder 14, an end wall sheet 128 is mounted upon, and across, the end posts 125 and the rear side posts 124 to confine any dust from the battery plates within the compartment 127.

A horizontally reciprocable shuttle member 128, which is substantially parallel with the support plate 35, is mounted along its lateral edges upon a plurality of rollers 129, which are rotatably supported upon the side plates 121 and 122 near to, but spaced from, the upper edges thereof. Said shuttle member is comprised of a flat, shuttle plate 131, which forms the bottom of the compartment 127, and a selector plate 132, which is secured upon the shuttle plate 131, as by means of the screw 133, for adjustment lengthwise of the plate 131. When the shuttle member 128 is in its retracted or frontward position, as shown in FIGURES 2 and 3, the selector plate 132 is spaced from the end posts 125 a distance somewhat greater than the width of the particular battery elements handled by the feeding device. When the shuttle member 128 is moved rearwardly, the rearward edge 134 of the selector plate 132 engages the bottom plate or separator in the stack within the compartment 127, urging said plate or separator rearwardly below and beyond the lower ends of the end posts 125.

A limit plate 135 is slidably disposed between the end posts 125 for vertical adjustment therebetween. Adjustment means, including an adjustment block 136 mounted upon the crossbar 126, an adjustment screw 137 extending into the adjustment block 136 and an adjustment plate 138 secured to the limit plate 135, through which the adjustment screw is threadedly received, is provided for adjusting the lower edge of the limit plate 135 with respect to the upper surface of the shuttle plate 131, which is movable thereunder. A pair of downwardly extending positioning members 139 are pivotally mounted upon opposite edges of the plate 135 near its lower end and are resiliently prevented from being pivoted rearwardly, as shown in FIGURE 4, by the leaf spring 141. In this particular embodiment, the positioning members 139 extend downwardly a slightly greater distance than does the lower edge of the limit plate 135, as, for example, approximately .015 of an inch, for reasons appearing hereinafter.

A pair of stripping posts 142 are supported upon, and extend downwardly from, a transverse support bar 143, which is adjustably mounted upon the upper edges of the side plates 121 and 122, immediately frontward of the compartment 127. The rearward edges of said stripping posts 142 define the front end of the compartment 127 and, accordingly, prevent frontward movement of the stack of battery elements out of said compartment 127 when the shuttle member 128 is returned to its frontward, or rightward, position, as appearing in FIGURES 2 and 3, after feeding a battery element out through the rearward wall of said compartment.

One or more exhaust openings 145 are provided in, and through, that portion of the shuttle plate 131, near the rearward end thereof, which is disposed at the bottom of the compartment 127 when said shuttle member 128 is rotated. Any dust or powder within said compartment is removed through the exhaust openings 145 into the exhaust conduits 146, which communicate with the exhaust system 18, described in detail hereinafter. Particularly in the case of the separators, said exhaust system operates through said openings 145 to hold the battery elements firmly against the plate 131 during the movement thereof beneath the end posts 125. The separators, and sometimes the battery plates, become warped during handling or manufacture, and some means must be provided for holding them in a relatively planar position so they can pass uninterruptedly beneath said limit plate 135. Thus, the exhaust system 18, operating through the conduits 146 and the exhaust openings 145, provides means for dust removal, as well as for positioning of the battery elements for more efficient feeding thereof, hence, fewer malfunctions.

A pivot block 147 is mounted upon the lower surface of the shuttle member 128 and has a semi-cylindrical, downwardly opening pivot recess 148 disposed transversely of the shuttle member 128. A pivot roller 149, which is removably disposed within the pivot slot 148, is rotatably secured to the upper end of a pivot bar 151, whose lower end is pivotally mounted upon an elongated pivot shaft 152, which is supported upon the frame structure 11, as by the brackets 153, below and substantially parallel with the line shaft 67. A cam follower 154 (FIGURE 4) is rotatably mounted upon, and extends sidewardly from, the pivot bar 151, between the upper and lower ends thereof, for reception into an eccentric cam groove 155 in the face of a cam disk 156 mounted upon, and rotatable with, the line shaft 67, below the shuttle member 138. Thus, rotation of the line shaft 67, hence the cam disk 156, effects a horizontal reciprocation of the shuttle member 128 transversely of the machine 10, hence transversely of the conveyor mechanism 12. In this particular embodiment, both the pivot bar 151 and the upper portion of the cam disk 156 extend upwardly through a slot 157 (FIGURE 3) in the support plate 35.

A pair of substantially identical plate stack gripping mechanisms 158 and 159 (FIGURES 2, 3 and 5) are disposed upon opposite sides of each plate feeder 14. Since said gripping mechanisms are substantially identical, in this particular embodiment, the detailed description of one of said gripping mechanisms will be given herein and such will be understood to apply to both of said gripping mechanisms.

The gripping mechanism 158 is comprised of a vertically movable, gripping plate 161, which is slidably disposed between the side posts 123 and 124. A pair of cam rollers 162 and 163 are rotatably supported upon a substantially horizontal shaft 164 for engagement with the outer surface of the gripping plate 161. Said shaft 164 is mounted upon the side posts 123 and 124 near the upper edge of the side plate 122. The gripping plate 161 is prevented from falling outwardly from the compartment 127 by means of a crossbar 165 secured to the side posts 123 and 124 near the upper end, and outwardly, of said plate 161, and by means of the upper edge of the side plate 122. A flat, resilient gripping sheet 166, which may be fabricated from relatively soft rubber, is secured to the inner surface of the plate 161 near the lower edge thereof for engaging the adjacent edges of the battery plates disposed within the compartment 127. The upper portion of the gripping sheet 166 is beveled into the plane of the inner surface of the plate 161 so that only the lower battery plates within the compartment are engaged by said gripping sheet.

A flange 167 is secured to, and extends outwardly from, the plate 161 near the upper edge thereof. A lift bar 168 is releasably engaged at its upper end with the flange 167 and is pivotally mounted at its lower end upon a rocker arme 169 (FIGURES 2 and 5) between the ends thereof. The frontward end of the arm 169 has a downward extension 171 which extends through an opening 172 in the support plate 35 for engaging cam means such as those shown in said Patent No. 2,908,377 mounted upon, and rotatable with, the line shaft 67. The rearward end of the rocker arm 169 is pivotally supported upon a line shaft 175, which in turn is rotatably supported by any convenient bearing means such as are shown in said Patent No. 2,908,377 upon the rear channel member 34.

A pair of resilient members, such as the springs 177, are secured between the cam roller shaft 164 and the gripping plate 161 at points above said cam roller shaft for the purpose of assisting gravity in urging said plate 161, hence the forward end of the rocker arm 169, downwardly against the cam means. Thus, the plate 161 is urged upwardly by the rocker arm 169 operating through the lift bar 168 each time the line shaft 67 is rotated. An upwardly and inwardly tapered cam plate 178 (FIGURE 5) is mounted upon the outer surface of the vertical plate 161, near the lower end thereof for engagement with the cam rollers 162 and 163. Thus, as the gripping plate 161 is raised by the cam means, the cam strip 178, upon being engaged by the cam rollers 162 and 163, urges the lower end of said plate 161 inwardly toward the stack of battery plates disposed within the compartment 127 for the purpose of engaging the adjacent edges of said plates. The bottom, expanded end of the cam strip 178 may be arranged for engaging the upper adjacent edge of the side plate 122 for the purpose of limiting the downward movement of the plate 161 and thereby preventing its interference with the reciprocable movement of the shuttle member 128.

Since the gripping mechanisms 158 and 159 are substantially identical, upward movement of their respective gripping plates 161 will cause the lower ends of said plates to move toward each other as they move upwardly, thereby gripping the opposite lateral edges of the battery plates disposed therebetween for the purpose of raising the stack of said plates and relieving the pressure on the lower one or two within said stack. Thus, the shuttle member 128 can move the bottom one of said plates out through the rearward wall of the compartment 127 without impedance from frictional resistance due to the load of the stack. Obviously, elimination of the load also eliminates the possibility of damage or disfiguration of said plates due to scraping or forcing the battery plate out from under the stack above it.

In some cases, as hereinafter indicated in more detail, it is desirable to feed the battery plates endwise onto the conveyor 12 from plate feeders 14 located along the side of the conveyor as shown in FIGURE 7. However, the dimension of the battery plates which is horizontal in normal use is substantially constant for various sizes and types of battery plates whereas the dimension which is vertical in normal use often varies widely. Thus, it will be advantageous to place the gripping mechanisms 158 and 159 at the front and rear ends of the compartment, namely, the ends intersected by the direction of movement of the shuttle, rather than at the sides of the compartment as shown in FIGURES 2, 4 and 5. In such case, it may be desirable to load the feeding device from the side (FIGURE 7).

As shown in FIGURE 1, the line shaft 175 is driven from the line shaft 67 by the chain 179, which is engageable with sprockets mounted upon the line shafts 67 and 175 near the trailing end of the machine 10. A drive shaft 181 is rotatably supported upon any convenient bearing supports such as are shown in said Patent No. 2,908,377 parallel with, and directly above, the line shaft 175. The drive shaft 181 and the line shaft 175, which are mutually engaged by gear means not shown, are disposed between the rearward sides of the compartments 127 of the feeding devices 14, and the frontward side of the conveyor frame 41. A pinion 182 is mounted upon, and rotatable with, said drive shaft 181 adjacent to the trailing side of each of said feeding devices.

Vertically adjustable bearing blocks 183 are disposed above the drive shaft 181 on each side of the feeding device 14 for rotatably receiving and supporting the opposite ends of a stub shaft 184 disposed parallel with, and directly above, the drive shaft 181. Said stub shaft supports a pinion 185, which is engageable with said pinion 182 on the drive shaft 181, whereby a counter-rotation is effected between the stub shaft 184 and the drive shaft 181.

Each feeding device, such as the plate feeder 14, is provided with a transfer feeding mechanism 187 (FIGURES 1, 2 and 3). Said feeding mechanism 187 is comprised of two pairs of resilient, peripherally engaged feed rollers 188 and 189 mounted upon the stub shafts 184 and the drive shaft 181, respectively. Said pairs of rollers are spaced from each other and disposed adjacent to the rearward wall of each feeding device 14 and for engaging said battery elements as they are urged under the rearward wall of the compartment 127 by the shuttle member 128.

A pair of spaced, pivot arms 191 and 192 (FIGURE 2) are pivotally supported upon each stub shaft 184 and extend rearwardly therefrom, where they are secured at their outer ends to the opposite ends of a rod 193, which is substantially parallel with, and spaced readwardly from, its stub shaft 184.

A support bar 194 extends rearwardly from, and is secured to, said rod 193. A pair of pulleys 195 is mounted upon the stub shaft 184 adjacent to the respective, opposing faces of the two feed rollers 188 supported thereon. Another pair of pulleys 196 is rotatably mounted upon opposite sides of the support bar 194 near its rearward, free end. The front pulleys 195 are connected to the rear pulleys 196 by a pair of belts 197 and 198. Thus, rotation of the stub shaft 184 by the inter-action of the pinions 185 and 182 effects a movement of the belts 197 and 198 so that the lower courses thereof move rearwardly.

A battery element support plate 199 (FIGURE 3), having a pair of spaced, transverse rollers 201 therein, is mounted upon the conveyor frame 41 rearwardly of each feeding device and directly under each transfer feeding mechanism 187. Thus, when the battery elements are urged rearwardly by the shuttle element 128, they are first engaged by the feed rollers 188 and 189, after which they are engaged between the lower courses of the belts 197 and 198 and the upper peripheries of the rollers 201 in the support plate 199, whereby said battery elements are moved from the compartment 127 onto the upper courses of the conveyor chains 47 and 48.

The rearward, free end of each support bar 194 is engageable by one end of a lift finger 202 (FIGURE 3), of which there is one for each feeding mechanism 187, the other end of said lift finger being secured to a rocker shaft 203. As shown in FIGURES 1 and 3, the rocker shaft 203 is pivotally mounted by means of the brackets 204 upon the side sheet 114 along the rearward edge of the conveyor frame 41. The rocker shaft 203 is pivoted through an arc of approximately 45°, in this particular embodiment, by means of linkage 205, which connects said shaft 203 to the line shaft 67. Said linkage includes a rocker bar 206 which is pivoted between its ends upon the frame structure 11 and has a cam follower, not shown, of any convenient type such as shown in said Patent No. 2,908,377 mounted upon its frontward end and engaging the periphery of a cam 208 mounted upon, and rotatable with, the line shaft 67.

A guide member 209 is mounted upon the side sheet 114 opposite each one of the feeding devices 14, said member being disposed above the conveyor bed 44 at a distance permitting the passage of the battery elements carried by the conveyor chains 47 and 48 therebeneath. A similar guide member 210 is mounted beneath and upon each support plate 199 for substantially the same purposes as the guide member 209. The guide member 209 and support plate 199 define a platform on which the panel may rest before it is engaged by the hooks 58. The guide members 209 and 210 have upwardly angled end portions 209a and 210a for directing battery elements carried by the conveyor chains 47 and 48 beneath said guide members and support plates. Thus, the feeding mechanism 187 urges a battery element out of its respective compartment 127 into the guide members 209 and 210, which are directly rearward of the particular feeding device concerned. However, that particular battery element will move under the guide members 209 and 210 of all subsequent feeding devices which it passes as it is urged by said conveyor mechanism 12 toward the discharge end of the machine 10.

The exhaust system 18 (FIGURE 1) includes a centrifugal blower 19 operated by any convenient motor not shown. The blower inlet is connected in a conventional manner to a front plenum chamber 213 and rear plenum chamber 214. The front plenum chamber 213 is in turn connected to the exhaust conduits 146 (FIGURE 3) by flexible pipes 215. The rear plenum chamber 214 is connected by pipes 216 to the chamber 217, disposed below the conveyor frame 41, through the lower wall 218 of said chamber. The centrifugal blower 19 exhausts into an exhaust plenum 219, which is connected to an exhaust duct 221. The exhaust chamber 217, being under the conveyor mechanism 12, will catch any dust or particles which are loosened from the battery elements during their movement to the discharge end of the machine 10.

As shown in FIGURES 2 and 3, each feeding mechanism 187 is provided with a normally open feed switch 283, which is supported upon the support bar 194 between the pulleys 195 and 196. Said switch 283 has a switch arm 284, which extends downwardly toward, but does not engage, the support plate 199. When the feeding mechanism 187 is in its lowered position, as appearing in FIGURE 3, and there is no battery element disposed between the feeding mechanism and said support plate 199, said switches 283 will be open. However, when a battery element is passing over the support plate 199, the switch arms 284 will be raised, thereby closing the feed switches 283. The feed switches 283 of several feeding devices 14 may be connected in series and, therefore, if any one of the feeding devices 14 fails to feed a battery element onto the conveyor mechanism 12 at the simultaneous and appointed time, the series circuit between said feed switches 283 will be broken.

Operation

As will be observed from the above detailed disclosure of the construction of the automatic assembling machine, the conveyor mechanism 12, the feeding devices 14 of the feeding apparatus 13 and the feeding mechanisms 187 are all coupled together by various chains, sprockets and gears, as described above, for operation by a single motor 71. Thus, the speed of operation of the assembling machine 10 may be varied by altering the pitch of the variable pitch pulley 72 mounted upon said motor 71. After such operating speed has been selected as desired or required, the plate feeder 14 is loaded with a stack of battery plates.

The limit plate 135 is adjusted vertically by the screw 137 with respect to the shuttle plate 131 in each of the feeding devices 14 to permit one battery element at a time to be fed therebetween by their respective shuttle members 128. The selector plate 132 is adjusted upon the shuttle plate 131 to correspond to the size and type of battery element being fed thereby in the particular instance. Likewise, the transverse support bar 143, carrying the stripping posts 142, is adjusted along the side plates 121 and 122 with respect to the end posts 125, also to correspond to the size of said battery elements. With this preparation, the machine 10 is ready for operation so that the motor 71 and the blower 19 can be energized.

During one feeding cycle, the line shaft 67 rotates the cam disks 156 through 360° simultaneously, thereby reciprocating the shuttle member 128 forwardly and then rearwardly. The reciprocation of the shuttle member 128 moves the bottom battery element in each compartment 127 rearwardly into position between the feed rollers 188 and 189 of the corresponding feeding mechanism 187.

In the case of the plate feeders 14, the element gripping mechanisms 158 and 159 on opposite sides of each feeder cooperate to lift all but a few of the battery plates in their respective compartments upwardly away from said shuttle member 128. This reduces the force required to move the bottom plate rearwardly, reduces the possibility of disfiguring said bottom plate during the movement thereof, and reduces the amount of dust created by such movement. The gripping mechanisms 158 and 159 are actuated by engagement between the cam means on the line shaft 67 and the rocker arms 169, which operate through the lift bars 168 and the gripping plates 161 to engage and lift said battery plates.

The stripping posts 142 prevent the frontward movement of the battery elements, immediately above that element being fed, when the shuttle member 128 is returned frontwardly into position for initiating the next feeding cycle. The exhaust openings 145 in the shuttle plate 131, and the exhaust system 18 connected thereto, provide means for urging warped or distorted battery elements, particularly battery plate separators, into a relatively planar position adjacent to the upper surface of the shuttle plate 131. The positioning members 139 on the opposite sides of the limit plate 135 adjacent to the bottom edge thereof urge the rearward edges of the battery elements down. Thus, said members 139 cooperate with the suction produced by the exhaust system 18 through the openings 145 to virtually insure the successful feeding of any reasonably satisfactory battery element under the limit plate 135 without malfunctions.

After the battery elements come between the feed rollers 188 and 189, said elements are advanced to a position between the support plate 199 and the belts 197 and 198, providing the feeding mechanism 187 is in its lowered position, as shown in FIGURE 3. The feed rollers 188 and 189 and the belts 197 and 198 are all driven by the line shaft 175 (FIGURE 1), which is in turn driven through the chain 179 by the line shaft 67. The battery element is advanced by the belts 197 and 198 onto the upper courses 49 and 50 of the conveyor chains 47 and 48, respectively, for movement thereby toward the discharge end of the conveyor mechanism 12. The rollers 201 in the support plate 199 ease the movement of the battery elements onto the conveyor mechanism. The natural arch in the belts 197 and 198 provides a positive, resilient control over the movement of the elements.

The rearward ends of the feeding mechanisms 187 are pivoted toward and away from the support plate 199 about the axes of the stub shafts 184 by the lift fingers 202, which are mounted upon the rocker shaft 203. The rocker shaft 203 is oscillated by the cam 208 operated through the linkage 205, and, therefore, the pivotal movement of the feeding mechanism 187 is synchronized with the rotation of the line shaft 67. The purpose of the lifting of the feeding mechanism 187 is to free the battery elements from engagement by the belts 197 and 198 for movement toward the platform 17 by the conveyor mechanism 12. As indicated by broken lines at A in FIGURE 2, the battery element is disposed upon the guide member 209 and the support plate 199 when it reaches the conveyor mechanism 12.

Shortly after said battery element reaches its broken line position A (FIGURE 2) and after the feeding mechanism 187 has been raised by the finger 202 into its raised position (FIGURE 1), the hooks 58 on the chains 47 and 48 engage the trailing edge of the battery element and move it toward the discharge end of the machine 10. The hooks 58 are uniformly spaced along the chains 47 and 48 at distances substantially equal to the center line distance between adjacent feeding devices 14 and 15. The movement of the chains is coordinated so that one set of hooks moves said distance between successive pairs of hooks during each feeding cycle, which is one full rotation of the line shaft 67. Said chains are moved by the line shaft 67.

FIGURE 6 discloses schematically, for comparison purposes, the relative arrangement between the conveyor mechanism 12 and the feeding devices 14 in the particular embodiment of our invention described in detail hereinabove. It will be apparent that the battery elements may be stacked in said feeding devices so that they will be fed onto the conveyor mechanism 12 either sidewise, as shown in FIGURE 6, or endwise, as shown in FIGURE 7.

Accordingly, we have disclosed a particular, preferred embodiment of our invention for illustrative purposes. However, it will be recognized that variations or modifications may be made in the assembling machine specifically disclosed herein, without departing from the scope of such invention, unless specifically stated to the contrary in the appended claims.

What is claimed is:
1. In a mechanism for feeding panels of relatively fragile material from a source of supply to an assembling conveyor which is moving through a closed path and has upstanding impellers at spaced intervals therealong;
   a platform comprising a support means and a guide means, the upper surfaces of which are substantially coplanar and which are spaced apart from each other in a lateral direction with respect to said conveyor, said support means and said guide means being elongated in a direction lengthwise of said conveyor and extending substantially parallel therewith;
   said support means and said guide means further being positioned above said conveyor but below the outer ends of said upstanding impellers, whereby said impellers will engage a panel resting on said support means and said guide means and move same onto said assembling conveyor;
   upwardly angled means on one end of said platform for directing panels carried by said conveyor beneath said support means and said guide means;
   feeding means adjacent to said assembly conveyor for feeding panels, one at a time, in a direction transversely of said conveyor toward said support means and said guide means, said feeding means having a panel supporting feed surface substantially coplanar with said support means;
   transfer feeding means including a belt conveyor normally horizontally disposed in a direction transversely of said assembling conveyor and extending from a point adjacent said panel supporting feed surface over said support means, the lower flight of said belt conveyor as said panels are fed being closely spaced from the upper surface of said support means and substantially parallel thereto, whereby a panel fed horizontally from its panel supporting feed surface by said feeding means is engaged and moved horizontally onto said supoprt means by said transfer feeding means and then moved onto said guide means while being maintained at all times in a substantially horizontal position by said belt conveyor.
2. A mechanism as set forth in claim 1, said feeding means including a vertically extending panel stacking zone above said panel supporting surface and a horizontally reciprocating shuttle at the lower end of said zone engageable with the lowermost panel therein for feeding same forwardly toward said conveyor, said shuttle being parallel with the upper surface of said panel supporting feed surface.

References Cited in the file of this patent
UNITED STATES PATENTS

| | | |
|---|---|---|
| 1,609,802 | Ekstrom et al. | Dec. 7, 1926 |
| 2,348,691 | Belli | May 12, 1943 |
| 2,603,341 | Knee | July 15, 1952 |
| 2,908,377 | Winkel | Oct. 13, 1959 |